United States Patent
Hsiao et al.

(10) Patent No.: US 11,960,762 B2
(45) Date of Patent: Apr. 16, 2024

(54) METHOD FOR MANAGING MEMORY BUFFER AND MEMORY CONTROL CIRCUIT UNIT AND MEMORY STORAGE APPARATUS THEREOF

(71) Applicant: PHISON ELECTRONICS CORP., Miaoli (TW)

(72) Inventors: Po-Wen Hsiao, Taipei (TW); Chun Hao Lin, Taoyuan (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/400,131

(22) Filed: Aug. 12, 2021

(65) Prior Publication Data

US 2023/0024660 A1 Jan. 26, 2023

(30) Foreign Application Priority Data

Jul. 20, 2021 (TW) ................................ 110126657

(51) Int. Cl.
*G06F 3/06* (2006.01)

(52) U.S. Cl.
CPC .......... *G06F 3/0656* (2013.01); *G06F 3/0604* (2013.01); *G06F 3/0659* (2013.01); *G06F 3/0679* (2013.01)

(58) Field of Classification Search
CPC .... G06F 3/0656; G06F 3/0604; G06F 3/0659; G06F 3/0679
See application file for complete search history.

(56) References Cited

U.S. PATENT DOCUMENTS 3,976,842 A * 8/1976 Hoyt ...................... H04B 1/662
704/201
5,412,780 A * 5/1995 Rushton ................ G06F 3/0601
711/113

(Continued)

FOREIGN PATENT DOCUMENTS

CN 106681932 5/2017

OTHER PUBLICATIONS

"Office Action of Taiwan Counterpart Application", dated Jan. 22, 2022, pp. 1-17.

(Continued)

*Primary Examiner* — Ramon A. Mercado
(74) *Attorney, Agent, or Firm* — JCIPRNET

(57) ABSTRACT

A method for managing a memory buffer, a memory control circuit unit, and a memory storage apparatus are provided. The method includes the following steps. Multiple consecutive first commands are received from a host system. A command ratio of read command among the first commands is calculated. The memory storage apparatus is being configured in a first mode or a second mode according to the command ratio and a ratio threshold. A first buffer is configured in a buffer memory to temporarily store a logical-to-physical address mapping table in response to the memory storage device being configured in the first mode, in which the first buffer has a first capacity. A second buffer is configured in the buffer memory in response to the memory storage device being configured in the second mode, in which the second buffer has a second capacity, which is greater than the first capacity.

24 Claims, 9 Drawing Sheets

(56) References Cited

U.S. PATENT DOCUMENTS

| | | | | |
|---|---|---|---|---|
| 2014/0032837 A1* | 1/2014 | Nagasaki | ............... | G06F 3/0653 |
| | | | | 711/E12.002 |
| 2014/0281125 A1* | 9/2014 | Meller | ................ | G06F 3/0644 |
| | | | | 711/103 |
| 2016/0350003 A1* | 12/2016 | Kanno | ................ | G06F 3/0656 |
| 2017/0351452 A1* | 12/2017 | Boyd | ................... | G06F 3/0611 |
| 2020/0310677 A1* | 10/2020 | Byun | ................... | G06F 3/0656 |
| 2023/0024660 A1* | 1/2023 | Hsiao | ................... | G06F 3/0656 |

OTHER PUBLICATIONS

"Office Action of China Counterpart Application", dated Apr. 29, 2023, p. 1-p. 10.

* cited by examiner

METHOD FOR MANAGING MEMORY BUFFER AND MEMORY CONTROL CIRCUIT UNIT AND MEMORY STORAGE APPARATUS THEREOF

CROSS-REFERENCE TO RELATED APPLICATION

This application claims the priority benefit of Taiwan application serial no. 110126657, filed on Jul. 20, 2021. The entirety of the above-mentioned patent application is hereby incorporated by reference herein and made a part of this specification.

BACKGROUND

Technical Field

This disclosure relates to a memory management technology, and in particular to a method for managing a memory buffer, a memory control circuit unit, and a memory storage apparatus.

Description of Related Art

Rapid growth in digital cameras, mobile phones and MP3 players over the past few years has led to a rapid increase in consumer demand for storage media. Since a rewriteable non-volatile memory module has characteristics such as non-volatile data, power saving, small size, no mechanical structure, and fast reading and writing speed, it is most suitable to be applied to portable electronic products, such as a notebook computer. A solid state drive is a memory storage apparatus that uses a flash memory module as a storage medium. Therefore, the flash memory industry has gained much attention among the electronics industries in recent years.

In general, the rewriteable non-volatile memory module usually includes multiple physical erasing units, and each physical erasing unit includes multiple physical programming units. A memory management circuit in the memory storage apparatus is configured with a logical address to map to the physical erasing unit. Each logical address has multiple logical units to map to a physical programming unit of the corresponding physical erasing unit.

In order to identify which physical erasing unit is the data of each logical address stored in, the memory management circuit records the mapping between the logical address and the physical erasing unit. Specifically, the memory management circuit stores multiple logical-to-physical address mapping tables in the rewriteable non-volatile memory module to record the physical erasing unit mapped by each logical address. When the memory management circuit wishes to access data, it loads a corresponding logical-to-physical address mapping table to the buffer memory, and writes or reads data according to the logical-to-physical address mapping table.

It should be noted that the buffer memory space is limited. In particular, when the memory management circuit executes a random read operation, different logical-to-physical address mapping tables are usually loaded multiple times, which occupy the buffer memory space. In addition, the performance of the memory storage apparatus deteriorates when the logical-to-physical address mapping table required to be loaded by the memory management circuit executing the random read operation exceeds the space allocated by the buffer memory to the logical-to-physical address mapping table.

SUMMARY

This disclosure provides a method for managing a memory buffer, a memory control circuit unit, and a memory storage apparatus, which can effectively improve usage efficiency and performance of the memory storage apparatus.

The disclosure provides the method for managing the memory buffer, which is applicable to the memory storage apparatus. The memory storage apparatus includes a rewriteable non-volatile memory module and a buffer memory. The rewriteable non-volatile memory module stores multiple logical-to-physical address mapping tables. The method includes the following steps. Multiple consecutive first commands are received from a host system. A command ratio of read command among the multiple first commands is calculated. The memory storage apparatus is being decided to be configured in a first mode or a second mode according to the command ratio and a ratio threshold. A first buffer is configured in the buffer memory to temporarily store the logical-to-physical address mapping table in response to the memory storage apparatus being configured in the first mode, in which the first buffer has a first capacity. A second buffer is configured in the buffer memory to temporarily store the logical-to-physical address mapping table in response to the memory storage apparatus being configured in the second mode, in which the second buffer has a second capacity. The second capacity is greater than the first capacity.

In an exemplary embodiment of the disclosure, the logical-to-physical address mapping table temporarily stored in the first buffer and the second buffer is loaded from the rewriteable non-volatile memory module.

In an exemplary embodiment of the disclosure, the above-mentioned step of deciding to configure the memory storage apparatus in the first mode or the second mode according to the command ratio and the ratio threshold includes the following steps. The memory storage apparatus is configured in the first mode in response to the command ratio being less than the ratio threshold. And, the memory storage apparatus is configured in the second mode in response to the command ratio not being less than the ratio threshold.

In an exemplary embodiment of the disclosure, in response to the memory storage apparatus being configured in the second mode, the method further includes the following steps. A third buffer is configured in the buffer memory to temporarily store data associated with a write command of the host system, in which the third buffer is different from the second buffer and the third buffer has a third capacity.

In an exemplary embodiment of the disclosure, the above-mentioned step of deciding to configure the memory storage apparatus in the first mode or the second mode according to the command ratio and the ratio threshold includes the following steps. A cache unit included in the third buffer is being determined whether it is full. And, the memory storage apparatus is configured in the first mode in response to the cache unit included in the third buffer being full.

In an exemplary embodiment of the disclosure, the above-mentioned data associated with the write command includes the write command and write data corresponding to the write command.

In an exemplary embodiment of the disclosure, the above-mentioned method further includes the following steps. A total number of times of the memory storage apparatus switching from being configured in the second mode to being configured in the first mode and a number of times of the cache unit included in the third buffer being full during switching are recorded. And, a ratio of the number of times to the total number of times is calculated to obtain an effective ratio, and the ratio threshold is adjusted according to the effective ratio.

In an exemplary embodiment of the disclosure, the above-mentioned step of adjusting the ratio threshold according to the effective ratio includes the following steps. When the effective ratio is less than a previous effective ratio calculated when the memory storage apparatus previously switches from being configured in the second mode to being configured in the first mode, the ratio threshold is increased. And, when the effective ratio is not less than the previous effective ratio, the ratio threshold is reduced.

In an exemplary embodiment of the disclosure, the above-mentioned method further includes the following steps. A fourth buffer is configured in the buffer memory in response to the memory storage apparatus being configured in the first mode, in which the fourth buffer is different from the first buffer and the fourth buffer has a fourth capacity. A sum of the first capacity and the fourth capacity is equal to a sum of the second capacity and the third capacity.

The disclosure provides the memory control circuit unit, which is configured to control the memory storage apparatus. The memory storage apparatus includes a rewriteable non-volatile memory module. The rewriteable non-volatile memory module stores multiple logical-to-physical address mapping tables. The memory control circuit unit includes a host interface, a memory interface, a buffer memory, and a memory management circuit. The memory interface is configured to couple to the rewriteable non-volatile memory module. The buffer memory is coupled to the host interface and the memory interface. The memory management circuit is coupled to the host interface, the memory interface, and the buffer memory. The memory management circuit is configured to receive multiple consecutive first commands from the host system. The memory management circuit is further configured to decide whether to configure the memory storage apparatus in a first mode or a second mode according to a command ratio and a ratio threshold. The memory management circuit is further configured to configure a first buffer in the buffer memory to temporarily store the logical-to-physical address mapping table in response to the memory storage apparatus being configured in the first mode, in which the first buffer has a first capacity. And, the memory management circuit is further configured to configure a second buffer in the buffer memory to temporarily store the logical-to-physical address mapping table in response to the memory storage apparatus being configured in the second mode, in which the second buffer has a second capacity. The second capacity is greater than the first capacity.

In an exemplary embodiment of the disclosure, the logical-to-physical address mapping table temporarily stored in the first buffer and the second buffer is loaded from the rewriteable non-volatile memory module.

In an exemplary embodiment of the disclosure, the above-mentioned operation of deciding to configure the memory storage apparatus in the first mode or the second mode according to the command ratio and the ratio threshold includes the following steps. The memory storage apparatus is configured in the first mode in response to the command ratio being less than the ratio threshold. And, the memory storage apparatus is configured in the second mode in response to the command ratio not being less than the ratio threshold.

In an exemplary embodiment of the disclosure, the memory management circuit is further configured to configure a third buffer in the buffer memory to temporarily store data associated with a write command of the host system in response to the memory storage apparatus being configured in the second mode. The third buffer is different from the second buffer and the third buffer has a third capacity.

In an exemplary embodiment of the disclosure, the above-mentioned operation of deciding to configure the memory storage apparatus in the first mode or the second mode according to the command ratio and the ratio threshold includes the following steps. A cache unit included in the third buffer is being determined whether it is full. And, the memory storage apparatus is configured in the first mode in response to the cache unit included in the third buffer being full.

In an exemplary embodiment of the disclosure, the above-mentioned data associated with the write command includes the write command and write data corresponding to the write command.

In an exemplary embodiment of the disclosure, the above-mentioned memory management circuit is further configured to record a total number of times of the memory storage apparatus switching from being configured in the second mode to being configured in the first mode and a number of times the cache unit included in the third buffer being full during switching. In addition, the memory management circuit is further configured to calculate a ratio of the number of times to the total number of times to obtain an effective ratio, and adjust the ratio threshold according to the effective ratio.

In an exemplary embodiment of the disclosure, the above-mentioned operation of adjusting the ratio threshold according to the effective ratio includes the following steps. When the effective ratio is less than a previous effective ratio calculated when the memory storage apparatus previously switches from being configured in the second mode to being configured in the first mode, the ratio threshold is increased. And, when the effective ratio is not less than the previous effective ratio, the ratio threshold is reduced.

In an exemplary embodiment of the disclosure, the above-mentioned memory management circuit is further configured to configure a fourth buffer in the buffer memory in response to the memory storage apparatus being configured in the first mode, in which the fourth buffer is different from the first buffer and the fourth buffer has a fourth capacity. A sum of the first capacity and the fourth capacity is equal to a sum of the second capacity and the third capacity.

The disclosure provides the memory storage apparatus, which includes a connection interface unit, a rewriteable non-volatile memory module, and a memory control circuit unit. The rewriteable non-volatile memory module stores multiple logical-to-physical address mapping tables. The memory control circuit unit is coupled to the connection interface unit and the rewriteable non-volatile memory module. The memory control circuit unit includes a buffer memory. The memory control circuit unit is configured to receive multiple consecutive first commands from a host system. The memory control circuit unit is further configured to calculate a command ratio of read command among the multiple first commands. The memory control circuit unit is further configured to decide whether to configure the memory storage apparatus in a first mode or a second mode according to the command ratio and a ratio threshold. The memory control circuit unit is further configured to configure a first buffer in the buffer memory to temporarily store the logical-to-physical address mapping table in response to the memory storage apparatus being configured in the first mode, in which the first buffer has a first capacity. And, the memory control circuit unit is further configured to configure a second buffer in the buffer memory to temporarily store the logical-to-physical address mapping table in response to the memory storage apparatus being configured in the second mode, in which the second buffer has a second capacity. The second capacity is greater than the first capacity.

In an exemplary embodiment of the disclosure, the logical-to-physical address mapping table temporarily stored in the first buffer and the second buffer is loaded from the rewriteable non-volatile memory module.

In an exemplary embodiment of the disclosure, the abovementioned operation of deciding to configure the memory storage apparatus in the first mode or the second mode according to the command ratio and the ratio threshold includes the following steps. The memory storage apparatus is configured in the first mode in response to the command ratio being less than the ratio threshold. And, the memory storage apparatus is configured in the second mode in response to the command ratio not being less than the ratio threshold.

In an exemplary embodiment of the disclosure, the memory control circuit unit is further configured to configure a third buffer in the buffer memory to temporarily store data associated with a write command of the host system in response to the memory storage apparatus being configured in the second mode. The third buffer is different from the second buffer and the third buffer has a third capacity.

In an exemplary embodiment of the disclosure, the abovementioned operation of deciding to configure the memory storage apparatus in the first mode or the second mode according to the command ratio and the ratio threshold includes the following steps. A cache unit included in the third buffer is being determined whether it is full. And, the memory storage apparatus is configured in the first mode in response to the cache unit included in the third buffer being full.

In an exemplary embodiment of the disclosure, the abovementioned data associated with the write command includes the write command and write data corresponding to the write command.

In an exemplary embodiment of the disclosure, the abovementioned memory control circuit unit is further configured to record a total number of times of the memory storage apparatus switching from being configured in the second mode to being configured in the first mode and a number of times the cache unit included in the third buffer being full during switching. In addition, the memory control circuit unit is further configured to calculate a ratio of the number of times to the total number of times to obtain an effective ratio, and adjust the ratio threshold according to the effective ratio.

In an exemplary embodiment of the disclosure, the abovementioned operation of adjusting the ratio threshold according to the effective ratio includes the following steps. When the effective ratio is less than a previous effective ratio calculated when the memory storage apparatus previously switches from being configured in the second mode to being configured in the first mode, the ratio threshold is increased. And, when the effective ratio is not less than the previous effective ratio, the ratio threshold is reduced.

In an exemplary embodiment of the disclosure, the abovementioned memory control circuit unit is further configured to configure a fourth buffer in the buffer memory in response to the memory storage apparatus being configured in the first mode, in which the fourth buffer is different from the first buffer and the fourth buffer has a fourth capacity. A sum of the first capacity and the fourth capacity is equal to a sum of the second capacity and the third capacity.

Based on the above, the method for managing the memory buffer, the memory control circuit unit, and the memory storage apparatus provided by the disclosure may dynamically configure the buffers of the buffer memory according to the read operation mode executed by the host system. For example, in the exemplary embodiment of the disclosure, when the ratio of the read commands corresponding to the random read operation mode among the multiple commands exceeds the threshold, the accelerated mode is executed in the buffer memory, so as to configure more storage space to temporarily store the logical-to-physical address mapping table. In this way, the embodiments of the disclosure may execute the accelerated mode at an appropriate time, thereby improving the speed and performance of the memory storage apparatus during data reading.

To make the abovementioned more comprehensible, several embodiments accompanied by drawings are described in detail as follows.

DESCRIPTION OF THE EMBODIMENTS

In general, a memory storage apparatus (also referred to as a memory storage system) includes a rewriteable non-volatile memory module and a controller (also referred to as a control circuit unit). The memory storage apparatus is usually used together with the host system, enabling the host system to write data to the memory storage apparatus or read data from the memory storage apparatus.

Figure 1:
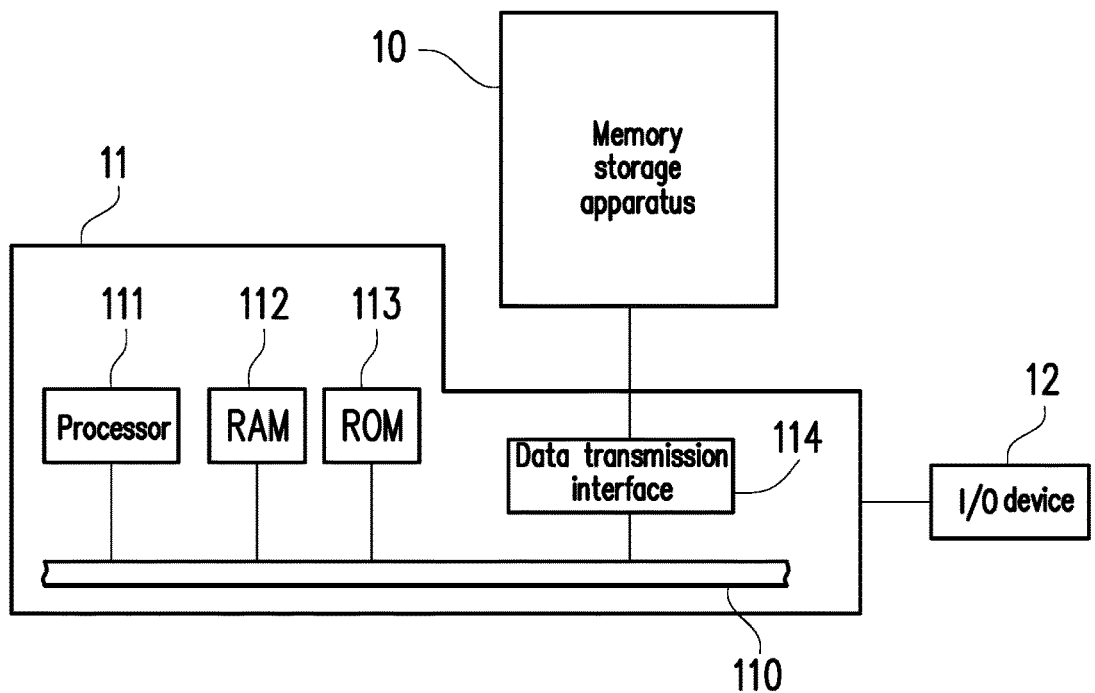
FIG. 1 is a schematic diagram of a host system, a memory storage apparatus, and an input/output (I/O) device according to an exemplary embodiment.

FIG. 1 is a schematic diagram of a host system, a memory storage apparatus, and an input/output (I/O) device according to an exemplary embodiment. In addition, FIG. 2 is a schematic diagram of a host system, a memory storage apparatus, and an input/output (I/O) device according to another exemplary embodiment.

Figure 2:
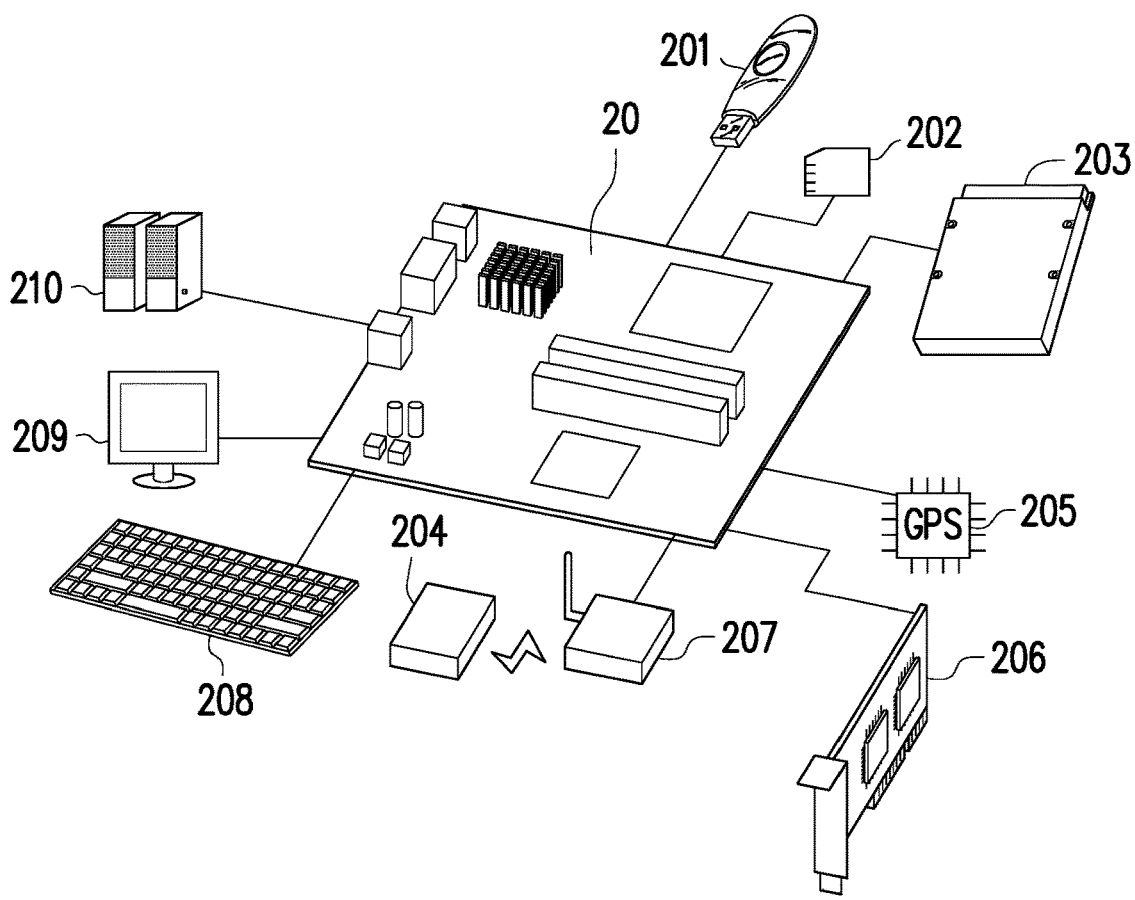
FIG. 2 is a schematic diagram of a host system, a memory storage apparatus, and an input/output (I/O) device according to another exemplary embodiment.

With reference to FIGS. 1 and 2, a host system 11 generally includes a processor 111, a random access memory (RAM) 112, a read-only memory (ROM) 113, and a data transmission interface 114. The processor 111, the random access memory 112, the read-only memory 113, and data transmission interface 114 are all coupled to a system bus 110.

In the exemplary embodiment, the host system 11 is coupled to a memory storage apparatus 10 through the data transmission interface 114. For example, the host system 11 may write data to or read data from the memory storage apparatus 10 via the data transmission interface 114. In addition, the host system 11 is coupled to an I/O device 12 through the system bus 110. For example, the host system 11 may transmit an output signal to or receive an input signal from the I/O device 12 via the system bus 110.

In the exemplary embodiment, the processor 111, the random access memory 112, the read-only memory 113, and the data transmission interface 114 may be disposed on a motherboard 20 of the host system 11. There may be one or more of the data transmission interface 114. The motherboard 20 may be coupled to the memory storage apparatus 10 through the data transmission interface 114, via a wired or a wireless means. The memory storage apparatus 10 may be, for example, a flash drive 201, a memory card 202, a solid state drive (SSD) 203, or a wireless memory storage apparatus 204. The wireless memory storage apparatus 204 may be, for example, a memory storage apparatus based on various wireless communication technologies such as a Near Field Communication Storage (NFC) memory storage apparatus, a wireless fax (WiFi) memory storage apparatus, a Bluetooth memory storage apparatus, and a low-power Bluetooth memory storage apparatus (for example, iBeacon). In addition, the motherboard 20 may also be coupled to various I/O devices such as a Global Positioning System (GPS) module 205, a network interface card 206, a wireless transmission device 207, a keyboard 208, a screen 209, and a speaker 210 through the system bus 110. For example, in an exemplary embodiment, the motherboard 20 may access the wireless memory storage apparatus 204 through the wireless transmission device 207.

Figure 3:
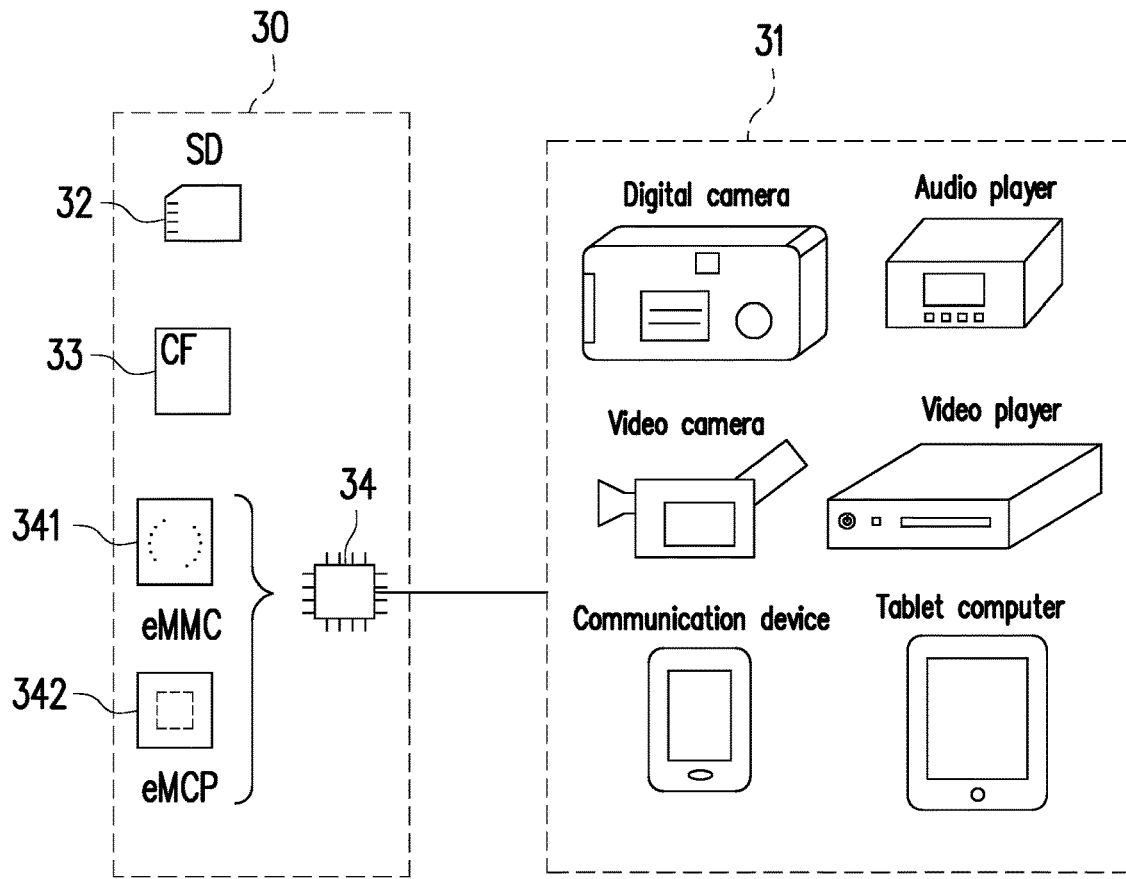
FIG. 3 is a schematic diagram of a host system and a memory storage apparatus according to another exemplary embodiment.

In an exemplary embodiment, the host system is any system that may substantially cooperate with a memory storage apparatus to store data. Although in the above-mentioned exemplary embodiment, the host system is described as a computer system, FIG. 3 is a schematic diagram of a host system and a memory storage apparatus according to another exemplary embodiment. With reference to FIG. 3, in another exemplary embodiment, a host system 31 may also be a system such as a digital camera, a video camera, a communication device, an audio player, a video player, or a tablet computer, and a memory storage apparatus 30 may be various non-volatile memory storage apparatus used by the host system 31 such as a SD card 32, a CF card 33, and an embedded storage device 34. The embedded storage device 34 includes various embedded storage devices that couple a memory module directly to a substrate of the host system such as an embedded MMC (eMMC) 341, and/or an embedded Multi-Chip Package (eMCP) 342.

Figure 4:
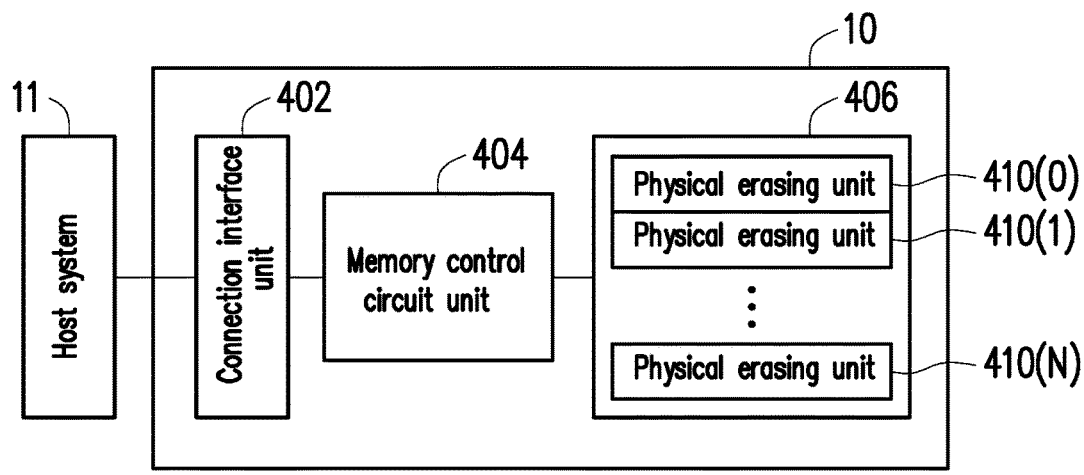
FIG. 4 is a schematic block diagram of the memory storage apparatus according to an exemplary embodiment of the disclosure.

FIG. 4 is a schematic block diagram of the memory storage apparatus according to an exemplary embodiment of the disclosure.

With reference to FIG. 4, the memory storage apparatus 10 includes a connection interface unit 402, a memory control circuit unit 404, and a rewriteable non-volatile memory module 406.

In the exemplary embodiment, the connection interface unit 402 is compatible with the Serial Advanced Technology Attachment (SATA) standard. However, it must be understood that the disclosure is not limited thereto. The connection interface unit 402 may also be in compliance with the Parallel Advanced Technology Attachment (PATA) standard, the Institute of Electrical and Electronic Engineers (IEEE) 1394 standard, the high-speed Peripheral Component Interconnect Express (PCI Express) standard, the universal serial bus (USB) standard, the Secure Digital (SD) interface standard, the Ultra High-Speed I (UHS-I) interface standard, the Ultra High-Speed II (UHS-II) interface standard, the Memory Stick (MS) interface standard, the Multi-Chip package (MCP) interface standard, the MultiMedia Card (MMC) interface standard, the embedded MultiMedia Card (eMMC) interface standard, the Universal Flash Storage (UFS) interface standard, the embedded Multi-Chip Package (eMCP) interface standard, the CompactFlash (CF) interface standard, the Integrated Device Electronics (IDE) standard or other suitable standards. The connection interface unit 402 and the memory control circuit unit 404 may be packaged in a chip, or the connection interface unit 402 may be disposed outside a chip that includes the memory control circuit unit 404.

The memory control circuit unit 404 is configured to execute multiple logic gates or control commands implemented in hardware or firmware, and to perform operations such as data writing, reading, or erasing in the rewriteable non-volatile memory module 406 according to a command of the host system 11.

The rewriteable non-volatile memory module 406 is coupled to the memory control circuit unit 404 and is configured to store data written by the host system 11. The rewriteable non-volatile memory module 406 may be a Single-Level Cell (SLC) NAND flash memory module (that is, a flash memory module that may store one data bit in a memory cell), a Multi-Level Cell (MLC) NAND flash memory module (that is, a flash memory module that may store two data bits in a memory cell), a Trinary-Level Cell (TLC) NAND flash memory module (that is, a flash memory module that may store three data bits in a memory cell), or other memory modules with the same characteristic.

The rewriteable non-volatile memory module 406 is coupled to the memory control circuit unit 404 and is configured to store the data written by the host system 11. The rewriteable non-volatile memory module 406 has physical erasing units 410(0) to 410(N). For example, the physical erasing units 410(0) to 410(N) may belong to a same memory die or belong to different memory dies. Each of the physical erasing units has multiple physical programming units, and the physical programming units belonging to the same physical erasing unit may be written independently and erased simultaneously. However, it must be understood that the disclosure is not limited thereto, and each of the physical erasing units may be composed of 64 physical programming units, 256 physical programming units, or any other number of physical programming units.

In more detail, the physical erasing unit is a smallest unit of erasure. That is, each of the physical erasing units contains a smallest number of memory cells that are erased together. The physical programming unit is a smallest unit of programming. That is, the physical programming unit is a smallest unit for writing data. Each of the physical programming units usually includes a data bit zone and a redundancy bit zone. The data bit zone contains multiple physical access addresses that are configured to store user data, and the redundancy bit zone is configured to store system data (for example, control information and error correcting codes). In the exemplary embodiment, the data bit zone of each of the physical programming units includes 8 physical access addresses, and a size of one physical access address is 512 bytes. However, in other exemplary embodiments, the data bit zone may also include more or less physical access addresses, and the disclosure does not limit the size and number of physical access addresses. For example, in an exemplary embodiment, the physical erasing unit is a physical block, and the physical programming unit is a physical page, or a physical sector, but the disclosure is not limited thereto.

Figure 5:
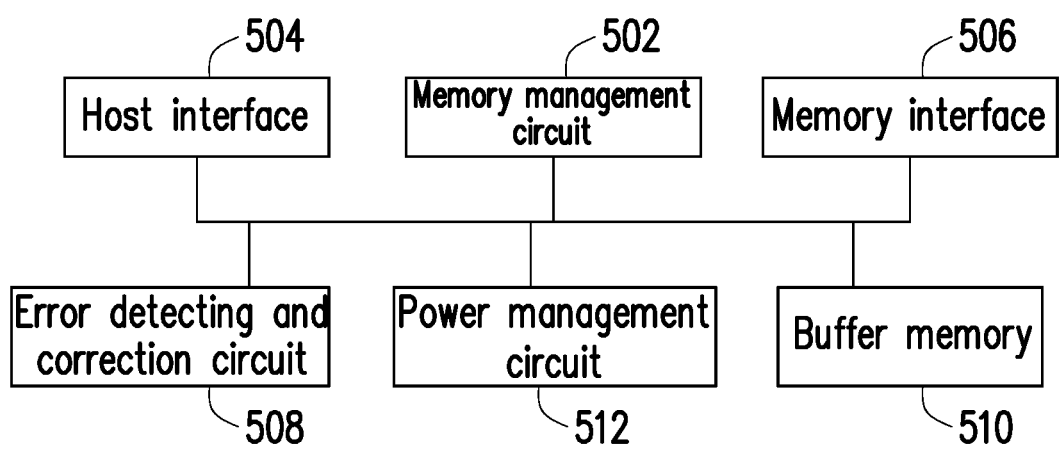
FIG. 5 is a schematic block diagram of the memory control circuit unit according to an exemplary embodiment of the disclosure.

FIG. 5 is a schematic block diagram of the memory control circuit unit according to an exemplary embodiment of the disclosure.

With reference to FIG. 5, the memory control circuit unit 404 includes a memory management circuit 502, a host interface 504, and a memory interface 506.

The memory management circuit 502 is configured to control an overall operation of the memory control circuit unit 404. Specifically, the memory management circuit 502 has multiple control commands, and during operation of the memory storage apparatus 10, the control command is executed to perform the operations such as data writing, reading, and erasing. The following description of an operation of the memory management circuit 502 is equivalent to the description of an operation of the memory control circuit unit 404.

In the exemplary embodiment, the control command of the memory management circuit 502 is implemented in firmware. For example, the memory management circuit 502 has a microprocessor unit (not shown) and a read-only memory (not shown), and the control command is programmed into the read-only memory. During the operation of the memory storage apparatus 10, the control command is executed by the microprocessor unit to perform the operations such as data writing, reading, and erasing.

In another exemplary embodiment, the control command of the memory management circuit 502 may also be stored as a code in a specific zone (for example, a system zone dedicated to storing the system data in the memory module) of the rewriteable non-volatile memory module 406. In addition, the memory management circuit 502 has a microprocessor unit (not shown), a read-only memory (not shown), and a random access memory (not shown). In particular, the read-only memory has a boot code, and when the memory control circuit unit 404 is enabled, the microprocessor unit will first execute the boot code to load the control command stored in the rewriteable non-volatile memory module 406 to the random access memory of the memory management circuit 502. After that, the microprocessor unit will run the control command to perform the operations such as data writing, reading, and erasing.

In addition, in another exemplary embodiment, the control command of the memory management circuit 502 may also be implemented in hardware. For example, the memory management circuit 502 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit and the data processing circuit are coupled to the microcontroller. The memory cell management circuit is configured to manage the memory cells or a group thereof of the rewriteable non-volatile memory module 406. The memory writing circuit is configured to issue a write command sequence to the rewriteable non-volatile memory module 406 to write data to the rewriteable non-volatile memory module 406. The memory reading circuit is configured to issue a read command sequence to the rewriteable non-volatile memory module 406 to read data from the rewriteable non-volatile memory module 406. The memory erasing circuit is configured to issue an erase command sequence to the rewriteable non-volatile memory module 406 to erase data from the rewriteable non-volatile memory module 406. The data processing circuit is configured to process the data that is to be written to the rewriteable non-volatile memory module 406 and the data that is read from the rewriteable non-volatile memory module 406. The write command sequence, the read command sequence, and the erase command sequence may each include one or more program codes or command codes and are configured to instruct the rewriteable non-volatile memory module 406 to execute corresponding operations such as writing, reading, and erasing. In an exemplary embodiment, the memory management circuit 502 may also issue other types of command sequences to instruct the rewriteable non-volatile memory module 406 to execute corresponding operations.

The host interface 504 is coupled to the memory management circuit 502 and is configured to receive and identify a command and data transmitted by the host system 11. In other words, the command and data transmitted by the host system 11 is transmitted to the memory management circuit 502 through the host interface 504. In the exemplary embodiment, the host interface 504 is compatible with the SATA standard. However, it must be understood that the disclosure is not limited thereto. The host interface 504 may also be compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 506 is coupled to the memory management circuit 502 and is configured to access the rewriteable non-volatile memory module 406. In other words, data to be written to the rewriteable non-volatile memory module 406 is converted to a format acceptable by the rewriteable non-volatile memory module 406 via the memory interface 506. Specifically, the memory interface 506 transmits a corresponding command sequence when the memory management circuit 502 wants to access the rewriteable non-volatile memory module 406. For example, command sequences may include a write command sequence instructing to write data, a read command sequence instructing to read data, an erase command sequence instructing to erase data, and command sequences corresponding to and configured to instruct various memory operations (for example, operations such as changing a voltage level or executing garbage recycling). The command sequences are, for example, generated by the memory management circuit 502 and transmitted to the rewriteable non-volatile memory module 406 through the memory interface 506. The command sequences may include one or more signals, or data on the bus. The signals or data may include a command code or a program code. For example, the read command sequence includes information such as a reading identification code and a memory address.

In an exemplary embodiment, the memory control circuit unit 404 further includes an error detecting and correction circuit 508, a buffer memory 510, and a power management circuit 512.

The error detecting and correction circuit 508 is coupled to the memory management circuit 502 and is configured to execute an error detecting and correcting procedure to ensure correctness of data. Specifically, the error detecting and correction circuit 508 generates a corresponding error correcting code (ECC) and/or an corresponding error detecting code (EDC) for data corresponding to a write command when the memory management circuit 502 receives the write command from the host system 11, and the memory management circuit 502 writes the data corresponding to the write command and the corresponding error correcting code and/or the corresponding error detecting code to the rewriteable non-volatile memory module 406. After that, the error correcting code and/or the error detecting code corresponding to the data are read simultaneously when the data from the rewriteable non-volatile memory module 406 is read by the memory management circuit 502, and the error detecting and correction circuit 508 executes the error detecting and correcting procedure on the read data according to the error correcting code and/or the error detecting code.

In the exemplary embodiment, a basic unit for the error detecting and correction circuit 508 to execute an encoding procedure is one frame. The one frame includes multiple data bits. In the exemplary embodiment, the one frame includes 256 bits. However, in another exemplary embodiment, the one frame may also include more or fewer bits.

In the exemplary embodiment, the error detecting and correction circuit 508 may perform single-frame encoding for data stored in one physical page, or may perform multi-frame encoding for data stored in multiple physical pages. The single-frame encoding and the multi-frame encoding may respectively use at least one of encoding algorithms such as low density parity code (LDPC), BCH code, convolutional code, or turbo code. Alternatively, in an exemplary embodiment, the multi-frame encoding may also use Reed-Solomon codes (RS codes) algorithm. In addition, in another exemplary embodiment, more encoding algorithms not listed above may also be used, which are not repeated here. According to the used encoding algorithm, the error detecting and correction circuit 508 may encode the data to be protected, so as to generate the corresponding error correcting code and/or the corresponding error detecting code. In the exemplary embodiment, the error correcting code and/or the error detecting code generated by encoding are collectively referred to as parity codes. Before the memory management circuit 502 writes the parity codes to the rewriteable non-volatile memory module 406, the parity codes are temporarily stored in a buffer of the buffer memory 510.

The buffer memory 510 is coupled to the memory management circuit 502 and is configured to temporarily store data and commands from the host system 11 or data from the rewriteable non-volatile memory module 406. The power management circuit 512 is coupled to the memory management circuit 502 and is configured to control power of the memory storage apparatus 10.

Figure 6:
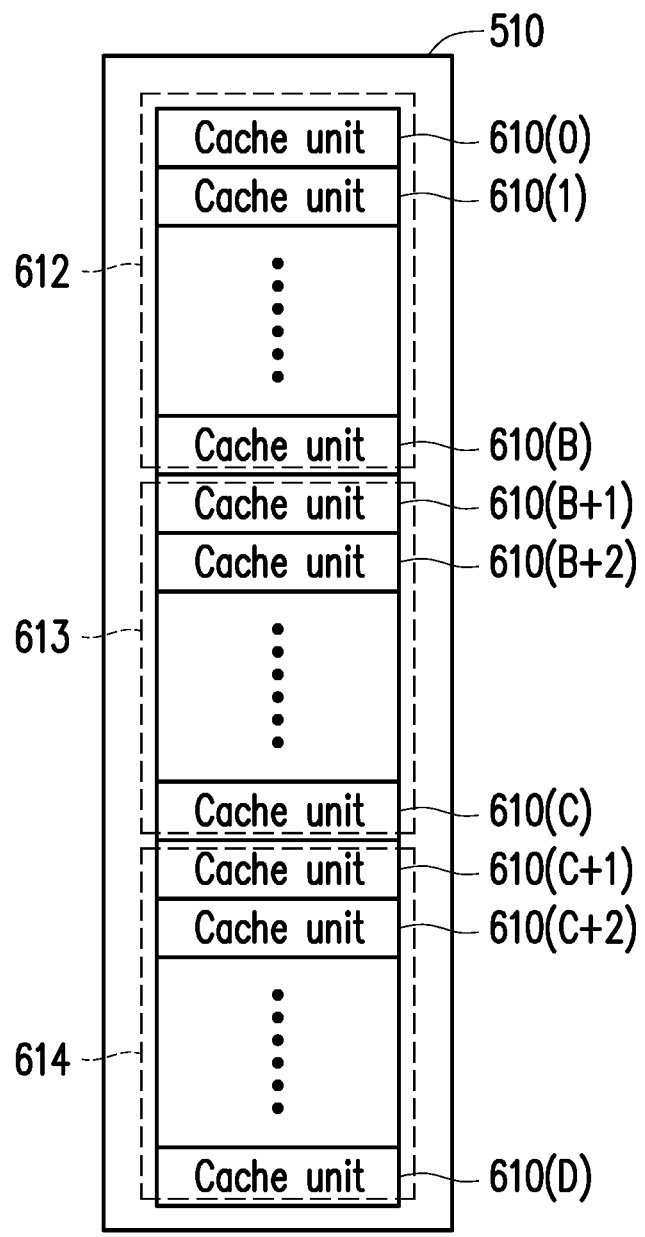
FIG. 6 is a schematic diagram of the buffer memory according to an exemplary embodiment of the disclosure.

FIG. 6 is a schematic diagram of the buffer memory according to an exemplary embodiment of the disclosure.

With reference to FIG. 6, the buffer memory 510 has cache units 610(0) to 610(D), and a capacity of each of the cache units is, for example, 4 KB. Specifically, the capacities of four cache units correspond to a capacity of a physical programming unit of the rewritable non-volatile memory. However, it must be understood that the exemplary embodiment does not limit the number of cache units configured in the buffer memory 510, the capacity of the cache unit, and size of the data transmitted by the host system 11. In addition, the host system 11, for example, transmits or accesses data in a unit of 4 KB. Alternatively, in another exemplary embodiment, a capacity of the data transmitted or accessed by the host system 11 each time may also be greater than or less than 4 KB.

Figure 7:
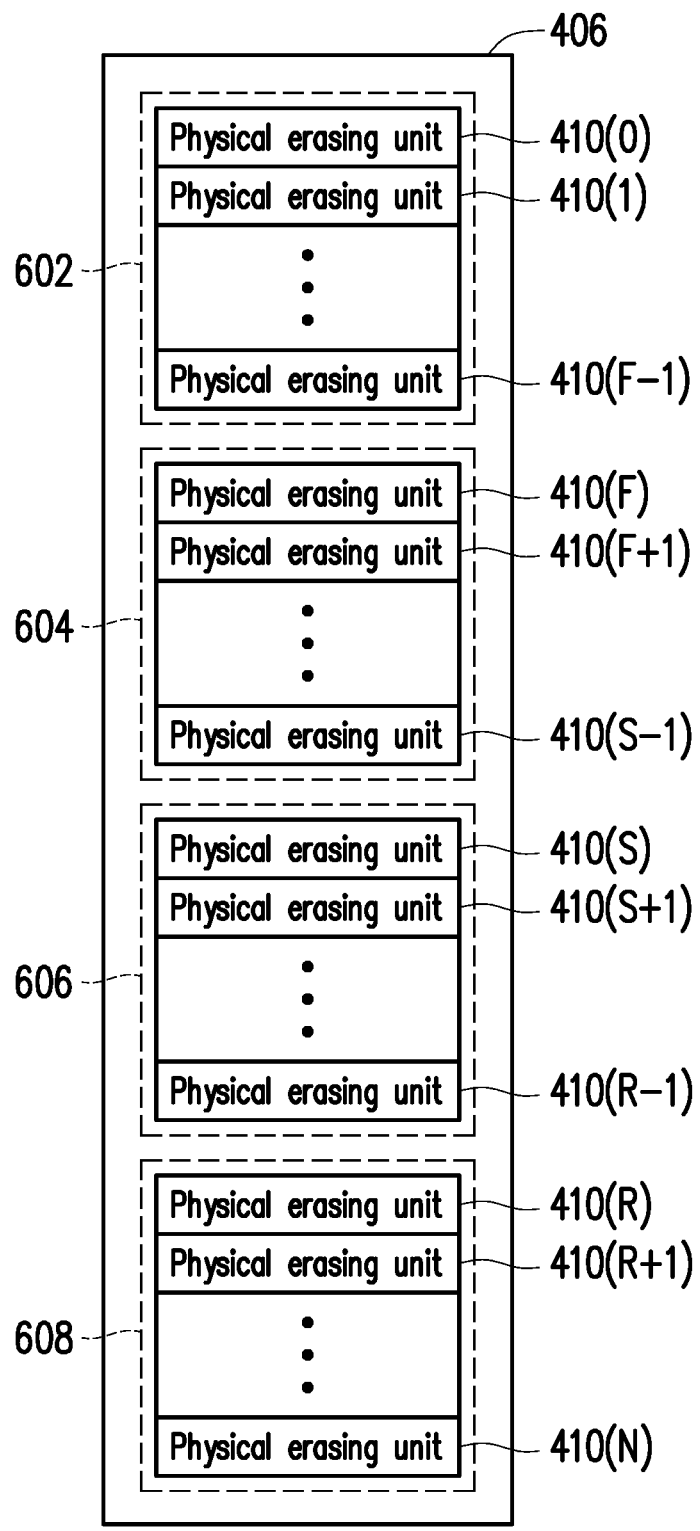
FIGS. 7 and 8 are exemplary schematic diagrams of managing a physical erasing unit according to an exemplary embodiment of the disclosure.
Figure 8:
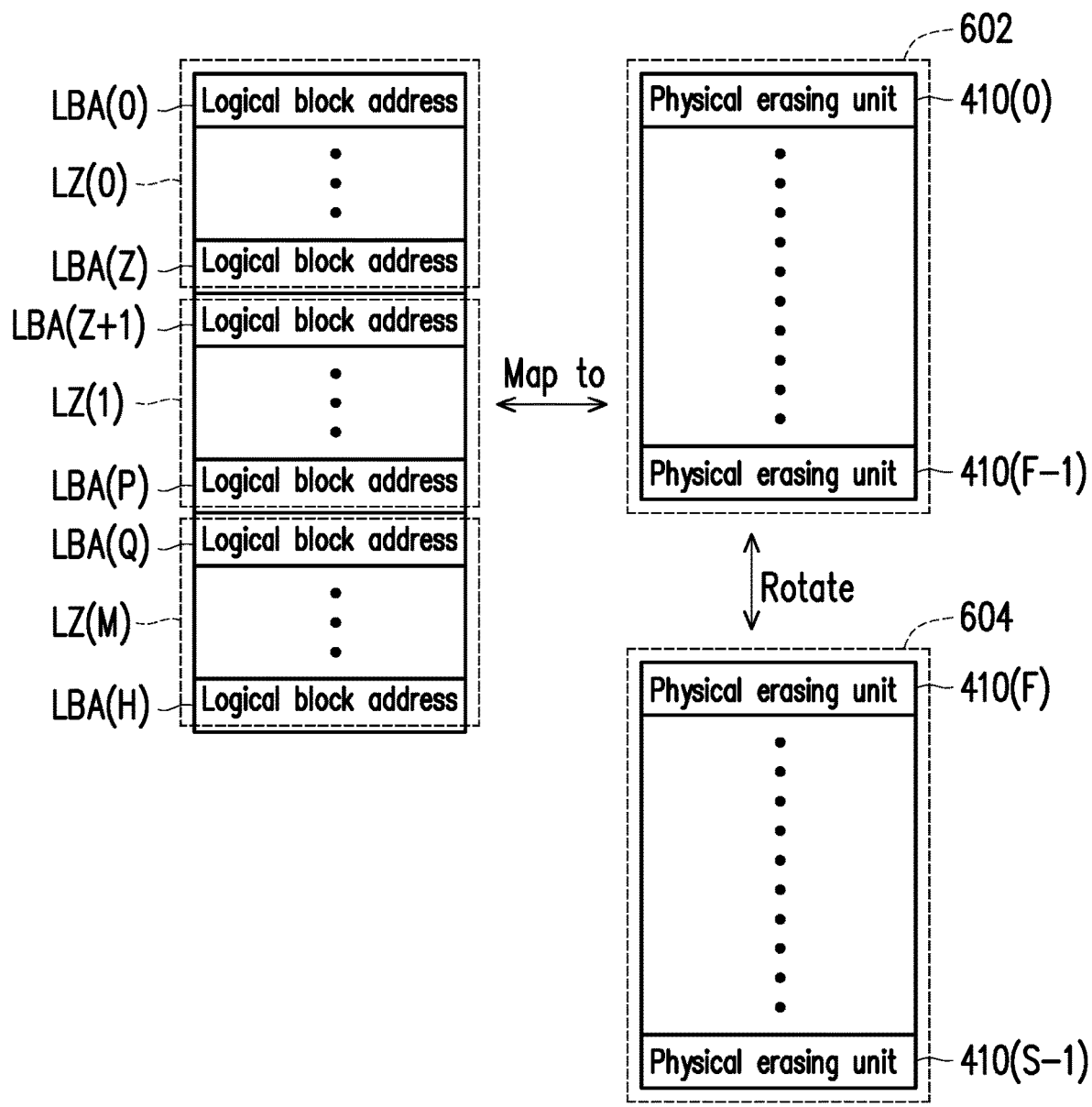

FIGS. 7 and 8 are exemplary schematic diagrams of managing a physical erasing unit according to an exemplary embodiment of the disclosure.

It must be understood that when describing an operation of the physical erasing unit of the rewriteable non-volatile memory module 406, it is a concept in logic to use words such as "extract", "group", "divide", and "associate" to describe the operation of the physical erasing unit. In other words, an actual location of the physical erasing unit of the rewriteable non-volatile memory module has not been changed, but an operation in logic has been performed on the physical erasing unit of the rewriteable non-volatile memory module.

With reference to FIG. 7, the memory management circuit 502 logically groups the physical erasing units 410(0) to 410(N) into a data zone 602, an idle zone 604, a system zone 606, and a replacement zone 608.

The physical erasing units belonging in logic to the data zone 602 and the idle zone 604 are configured to store the data from the host system 11. Specifically, the physical erasing units in the data zone 602 are regarded as the physical erasing units of stored data, and the physical erasing units in the idle zone 604 are configured to replace the physical erasing units in the data zone 602. In other words, when the write command and the data to be written are received from the host system 11, the memory management circuit 502 uses a physical erasing unit that is extracted from the idle zone 604 to write the data, so as to replace the physical erasing unit in the data zone 602.

The physical erasing unit belonging in logic to the system zone 606 is configured to record the system data. For example, the system data includes manufacturer and model of the rewriteable non-volatile memory module, the number of physical erasing units of the rewriteable non-volatile memory module, the number of physical programming units per physical erasing unit, and so on.

The physical erasing units belonging in logic to the replacement zone 608 is for a damaged physical erasing unit replacement program to replace a damaged physical erasing unit. Specifically, where there a still a normal physical erasing unit in the replacement zone 608 and the physical erasing unit in the data zone 602 is damaged, the memory management circuit 502 extracts the normal physical erasing unit from the replacement zone 608 to replace the damaged physical erasing unit.

In particular, the number of physical erasing units in the data zone 602, the idle zone 604, the system zone 606, and the replacement zone 608 vary according to different memory specifications. In addition, it must be understood that during operation of the memory storage apparatus 10, a grouping relationship of the physical erasing units associated with the data zone 602, the idle zone 604, the system zone 606, and the replacement zone 608 will dynamically change. For example, when the physical erasing unit in the idle zone 604 is damaged and replaced by a physical erasing unit in the replacement zone 608, the physical erasing unit originally in the replacement zone 608 will be associated with the idle zone 604.

With reference to FIG. 8, the memory management circuit 502 configures logical block addresses LBA(0) to LBA(H) to map to the physical erasing unit in the data zone 602. Each logical block address has multiple logical addresses (LA) to map to the physical programming units of the corresponding physical erasing unit. Moreover, when the host system 11 wants to write data to the logical address or update data stored in the logical address, the memory management circuit 502 extracts a physical erasing unit from the idle zone 604 to serve as an actuation physical erasing unit to write the data, so as to rotate the physical erasing units in the data zone 602. In addition, when the physical erasing unit serving as the actuation physical erasing unit is full, the memory management circuit 502 extracts another empty physical erasing unit from the idle zone 604 to serve as the actuation physical erasing unit, so as to continue writing update data corresponding to the write command from the host system 11. In addition, when the number of available physical erasing units in the idle zone 604 is less than a preset value, the memory management circuit 502 executes a garbage collection operation (also known as a valid data merging operation) to organize valid data in the data zone 602, so as to re-associate the physical erasing unit in the data zone 602 that does not store valid data to the idle zone 604.

It should be noted that due to limited capacity of the buffer memory 510, it is impossible to store a mapping table that records mapping relationships of all logical addresses. Therefore, in the exemplary embodiment, the memory management circuit 502 may group the logical block address LBA(0) to LBA(H) into multiple logical zones LZ(0) to LZ(M), and configure a logical-to-physical address mapping table for each logical zone.

In general, in order to identify which physical programming unit is the data of each logical address stored in, the memory management circuit 502 records the mapping relationship between the logical address and the physical programming unit (also known as the logical-to-physical mapping relationship). For example, in the exemplary embodiment, the memory management circuit 502 stores a logical-to-physical address mapping table in the rewriteable non-volatile memory module 406 to record the physical programming unit mapped by each of the logical addresses. When the host system 11 issues multiple read commands to the memory management circuit 502, the memory management circuit 502 places the read commands into a command queue, and the memory management circuit 502 decides an execution order of executing the read commands. The memory management circuit 502 loads the logical-to-physical address mapping table corresponding to the logical address into the buffer of the buffer memory 510. When the memory management circuit 502 wants to execute a read command, the memory management circuit 502 obtains the logical address to be read according to the read command, and obtain a physical erasing unit or a physical programming unit mapped by the logical address according to the logical-to-physical address mapping table loaded in the buffer memory 510, so as to read data from the physical erasing unit or the physical programming unit and transmit it to the host system 11. After that, the memory management circuit 502 may write or read data according to the logical-to-physical address mapping table loaded in the buffer memory 510.

It should be noted that when storage space of the buffer memory 510 is insufficient, and the logical-to-physical address mapping table corresponding to the read command is not temporarily stored in the buffer memory 510 (that is, the logical-to-physical address temporarily stored in the buffer memory 510 did not record the mapping of the logical address to be updated), the memory management circuit 502 executes a mapping table swapping operation, so as to resave the logical-to-physical address mapping table currently temporarily stored in the buffer memory 510 to the rewriteable non-volatile memory module 406, and load the logical-to-physical address mapping table recording the logical address to be read to the buffer memory 510.

In addition, when the host system 11 issues multiple write commands to the memory management circuit 502, the memory management circuit 502 temporarily stores the write commands and data corresponding to the write commands in the buffer of the buffer memory 510. When the memory management circuit 502 wants to execute a write command, the memory management circuit 502 may write data according to the write command and the logical-to-physical address mapping table loaded in the buffer memory 510.

Therefore, with reference to FIG. 6 again, in the exemplary embodiment, the buffer memory 510 may be configured to include at least a buffer 612, a buffer 613, and a buffer 614. The buffer 612 is configured to temporarily store commands, and write data, parity codes, or other data from the host system 11. The buffer 613 is configured to temporarily store read data from the rewriteable non-volatile memory module 406. And, the buffer 614 is configured to temporarily store the logical-to-physical address mapping table from the rewriteable non-volatile memory module 406. It should be noted that the disclosure does not intend to limit the number of cache units configured in the buffer 612, the buffer 613, and the buffer 614. In an exemplary embodiment, a capacity of the buffer 612 is greater than a capacity of the buffer 614. That is, a number of cache units configured in the buffer 612 is greater than a number of cache units configured in the buffer 614. In addition, a fixed number of cache units (for example, a corresponding capacity of 128 k) may be configured in the buffer 613.

It should be noted that the read command from the host system 11 may include, for example, a sequential read operation mode or a random read operation mode. The sequential read operation mode means that the host system 11 continuously issues multiple read commands to the rewriteable non-volatile memory module 406, so as to respectively execute multiple read operations. Mapping information required for the read operations is sequentially stored in the same logical-to-physical address mapping table. The memory management circuit 502 may, for example, determine that the mapping information of the logical addresses is sequentially stored in the same logical-to-physical address mapping table according to the logical addresses corresponding to the above-mentioned multiple read operations, thereby determining that a current operation mode of the rewritable non-volatile memory module 406 is the sequential read operation mode.

The random read operation mode means that host system 11 continuously issues multiple read commands to the rewriteable non-volatile memory module 406, so as to respectively execute multiple read operations. Mapping information required for and corresponding to each of the read operations is scattered and stored in multiple different logical-to-physical address mapping tables. The memory management circuit 502 may, for example, determine that the mapping information of the logical addresses is stored in multiple different logical-to-physical address mapping tables according to the logical addresses corresponding to the above-mentioned multiple read operations, thereby determining that the current operation mode of the rewriteable non-volatile memory module 406 is the random read operation mode.

In general, the capacity of the buffer 614 is limited. Therefore, when the host system 11 is executing the random read operation, the memory management circuit 502 has to load different logical-to-physical address mapping tables into the buffer 614 of the buffer memory 510 multiple times. In other words, due to the limited capacity of the buffer configured in the buffer memory 510 to store the logical-to-physical address mapping table, the memory management circuit 502 has to wait until it has read data corresponding to a current mapping information in the buffer 614 from the rewritable non-volatile memory module 406 to the buffer 613 and the buffer 613 has received the data, before the memory management circuit 502 may then load other portions of the mapping information to the buffer 614 and issue a next random read command in the command queue to the rewriteable non-volatile memory module 406. That is to say, when the host system 11 executes the random read operation, due to the limited capacity of the buffer, efficiency of executing the read commands is low, thereby causing overall performance of the memory storage apparatus 10 to decrease.

In view of this, in the exemplary embodiment, the memory management circuit 502 may dynamically arrange the configuration of the buffers in the buffer memory 510 according to the read operation mode executed by the host system 11.

In an exemplary embodiment, the memory management circuit 502 receives multiple consecutive commands (also referred to as the first commands) from the host system 11. For example, the commands may be write commands, read commands, or other commands. The memory management circuit 502 calculates a command ratio of the read commands among the first commands, and decides to configure the memory storage apparatus 10 in a first mode or a second mode according to the calculated command ratio and a ratio threshold. In particular, the ratio threshold may be determined via a series of pre-tests and analyses, or may be dynamically adjusted. In an exemplary embodiment, the memory management circuit 502 calculates a command ratio of the read commands corresponding to the random read operation mode among the first commands, and decides whether to configure the memory storage apparatus 10 in the first mode or the second mode according to the calculated command ratio and the ratio threshold.

For example, the memory management circuit 502 may configure the memory storage apparatus 10 in the first mode when the command ratio is less than the ratio threshold, and configure the memory storage apparatus 10 in the second mode when the command ratio is not less than the ratio threshold. In addition, the memory management circuit 502 may also configure the memory storage apparatus 10 in the second mode when differences between multiple calculated command ratios and the ratio threshold is less than a preset difference within a preset time range. However, the disclosure is not limited thereto.

In the exemplary embodiment, when the memory storage apparatus 10 is configured in the first mode, the memory management circuit 502 configures a buffer (also referred to as a first buffer) in the buffer memory 510 to temporarily store the logical-to-physical address mapping table. Here, the first buffer has a fixed capacity (also referred to as a first capacity). On the other hand, when the memory storage apparatus 10 is configured in the second mode, the memory management circuit 502 configures a buffer (also referred to as a second buffer) in the buffer memory 510 to temporarily store the logical-to-physical address mapping table. Here, the second buffer has a fixed capacity (also referred to as a second capacity), and the second capacity is greater than the first capacity of the first buffer in the first mode. In the exemplary embodiment, the logical-to-physical address mapping table is loaded from the rewriteable non-volatile memory module 406.

In particular, the first mode may be regarded as a general mode, and the second mode may be regarded as an accelerated mode executed in response to the host system 11 executing the random read operation multiple times. In other words, when the accelerated mode is executed, the memory management circuit 502 configures more storage space in the buffer memory 510 than in the general mode to temporarily store the logical-to-physical address mapping table loaded from the rewriteable non-volatile memory module 406.

In this way, the memory management circuit 502 may efficiently switch configuration modes to avoid a cost of frequent executing/leaving the accelerated mode through deciding whether to execute/leave the accelerated mode according to the command ratio of the read commands corresponding to the random read operation mode among the multiple commands. The cost is, for example, a cost of abandoning the data temporarily stored in the buffer memory 510 in order to increase the storage space to temporarily store the data loaded from the rewriteable non-volatile memory module 406, or write amplification due to execution of a flush operation.

In an exemplary embodiment, when the memory storage apparatus 10 is configured in the second mode, the memory management circuit 502 may further configure a buffer (also referred to as a third buffer) in the buffer memory 510 to temporarily store write data associated with the write command from the host system 11. For example, the data associated with the write command includes the write command and write data corresponding to a second command, but the disclosure is not limited thereto. Here, the third buffer is different from the second buffer configured in the buffer memory 510, and the third buffer has a fixed capacity (also referred to as a third capacity).

In addition, the memory management circuit 502 may decide whether to switch from the second mode to the first mode according to whether a cache unit included in the third buffer is full. In the exemplary embodiment, when the memory management circuit 502 configures the memory storage apparatus 10 in the second mode, the memory management circuit 502 determines whether the cache unit included in the third buffer is full (that is, space of the cache unit configured to the third buffer has been written with data). In addition, the memory management circuit 502 configures the memory storage apparatus 10 in the first mode when the cache unit included in the third buffer is full.

In other words, when the memory storage apparatus 10 is configured in the second mode, the memory management circuit 502 may carry other multiple commands or multiple data between the read commands corresponding to the random read operation mode through the third buffer. In this way, the memory management circuit 502 does not have to frequently switch between the normal mode and the accelerated mode, thereby avoiding the cost of frequently executing/leaving the accelerated mode.

Figure 9A:
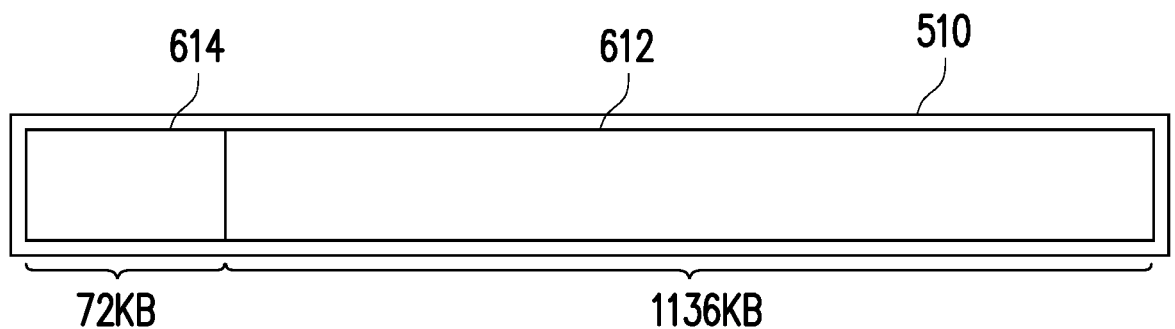
FIG. 9A is a schematic diagram of a capacity configuration of the buffer in the buffer memory in the first mode according to an exemplary embodiment of the disclosure.
Figure 9B:
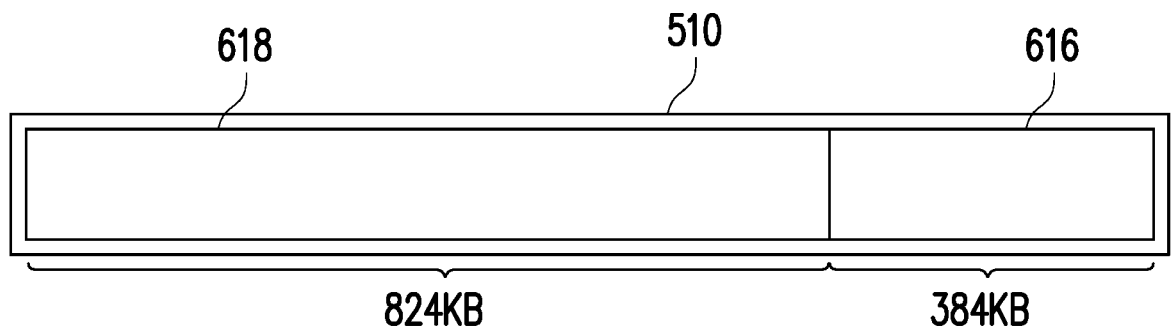
FIG. 9B is a schematic diagram of the capacity configuration of the buffer in the buffer memory in the first mode according to an exemplary embodiment of the disclosure.

FIG. 9A is a schematic diagram of a capacity configuration of the buffer in the buffer memory in the first mode according to an exemplary embodiment of the disclosure. FIG. 9B is a schematic diagram of the capacity configuration of the buffer in the buffer memory in the second mode according to an exemplary embodiment of the disclosure.

With reference to FIG. 9A first, in a first mode 910, the memory management circuit 502 configures the buffer memory 510 to include a buffer 614 (also referred to as the first buffer) and a buffer 612 (also referred to as a fourth buffer), and a sum of a capacity of the buffer 612 and a capacity of the buffer 614 is a predetermined value. In the exemplary embodiment, it is assumed that the total capacity of the buffer 612 and the buffer 614 is 1208 KB, the capacity of the buffer 614 is 72 KB, and the capacity of the buffer 612 is 1136 KB. In the exemplary embodiment, the memory management circuit 502 configures the buffer 614 to temporarily store the logical-to-physical address mapping table, and configures the buffer 612 to temporarily store the data associated with the write command.

With reference to FIG. 9B, in a second mode 920, the memory management circuit 502 configures a buffer 618 (also referred to as the second buffer) to have a capacity of 824 KB, and configures a buffer 616 (also referred to as the third buffer) to have a capacity of 384 KB. In the exemplary embodiment, the memory management circuit 502 configures the buffer 618 to temporarily store the logical-to-physical address mapping table, and configures the buffer 616 to temporarily store the data associated with the write command. In the exemplary embodiment, a sum of the capacity of the buffer 616 and the capacity of the buffer 618 is the same as the predetermined value of the first mode 910, and the capacity of the buffer 618 in the second mode 920 is greater than the capacity of the buffer 614 in the first mode 910. That is, when the second mode 920 is executed, the memory management circuit 502 configures more storage space in the buffer memory 510 to temporarily store the logical-to-physical address mapping table loaded from the rewriteable non-volatile memory module 406 than in the first mode 910.

Figure 10A:
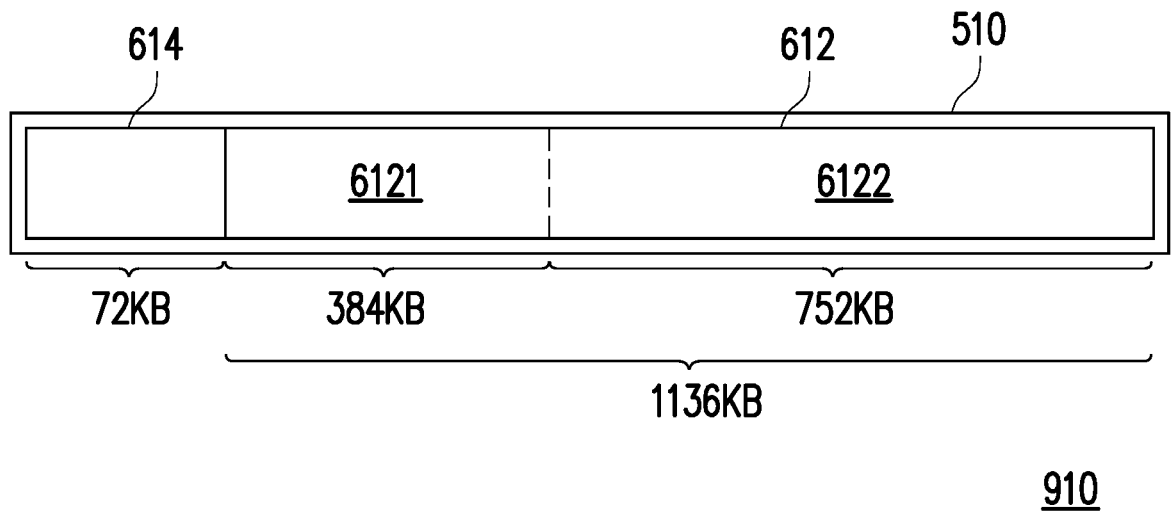
FIG. 10A is a schematic diagram of a capacity configuration of the buffer in the buffer memory in the first mode according to another exemplary embodiment of the disclosure.
Figure 10B:
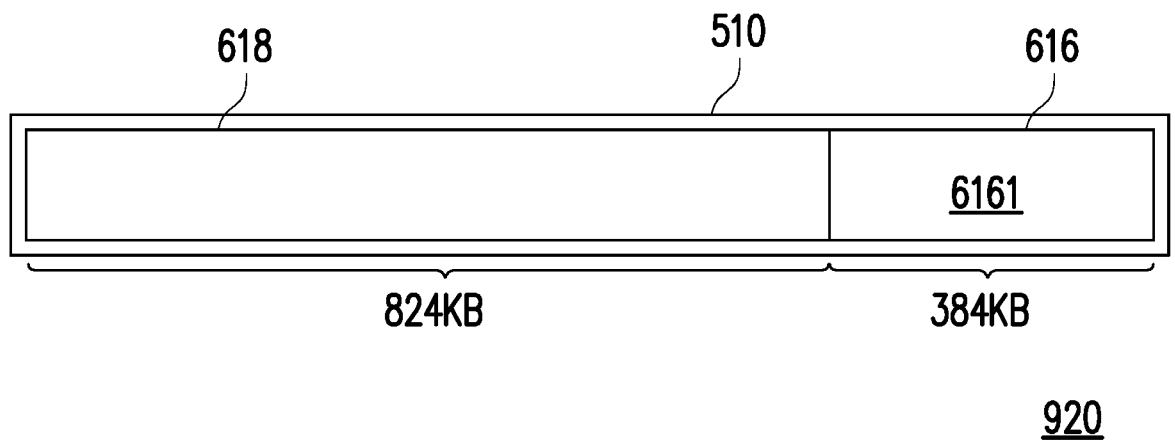
FIG. 10B is a schematic diagram of the capacity configuration of the buffer in the buffer memory in the first mode according to another exemplary embodiment of the disclosure.

FIG. 10A is a schematic diagram of a capacity configuration of the buffer in the buffer memory in the first mode according to another exemplary embodiment of the disclosure. FIG. 10B is a schematic diagram of the capacity configuration of the buffer in the buffer memory in the second mode according to another exemplary embodiment of the disclosure.

With reference to FIG. 10A first, reference may be made to FIG. 9A for the implementation means of configuring the buffer 612 and the buffer 614 in the first mode 910, which is not repeated here. In the exemplary embodiment, the buffer 612 configured by the memory management circuit 502 includes a sub-buffer 6121 and a sub-buffer 6122. Here, the memory management circuit 502 configures the sub-buffer 6121 to temporarily store the write command and the write data corresponding to the write command, and configures the sub-buffer 6122 to temporarily store the parity codes, and a mapping table used by the garbage collection operation or other data. In the exemplary embodiment, it is assumed that a capacity of the sub-buffer 6121 is 384 KB, and a capacity of the sub-buffer 6122 is 752 KB.

With reference to FIG. 10B, reference may be made to FIG. 9B for the implementation means of configuring the buffer 616 and the buffer 618 in the second mode 920, which is not repeated here. In the exemplary embodiment, the memory management circuit 502 executes the flush operation of the sub-buffer 6122 in the first mode 910 to write temporary storage data temporarily stored in the sub-buffer 6122 to the rewriteable non-volatile memory module 406, so as to release the capacity of the sub-buffer 6122 for the buffer 618 to store the logical-to-physical address mapping tables. In this way, with reference to FIG. 10B, the buffer 616 is only configured with a buffer 6161 for temporarily storing the write command and the write data corresponding to the write command. In addition, when the memory management circuit 502 switches from configuring the memory storage apparatus 10 in the second mode 920 to the first mode 910, the memory management circuit 502 may load the temporary storage data in the rewriteable non-volatile memory module 406 that is written during execution of the flush operation to the sub-buffer 6122.

In an exemplary embodiment, the memory management circuit 502 may dynamically adjust the above-mentioned ratio threshold. In an operation of dynamically adjusting the ratio threshold, the memory management circuit 502 records a total number of times of the memory storage apparatus 10 switching from being configured in the second mode to being configured in the first mode and a number of times the cache unit included in the third buffer being full during the switching. Next, the memory management circuit 502 calculates a ratio of the number of times being full to the total number of switching to obtain an effective ratio, and adjusts the ratio threshold according to the effective ratio.

For example, when the memory management circuit 502 determines that the effective ratio is less than a previous effective ratio calculated when the memory storage apparatus 10 previously switches from being configured in the second mode to being configured in the first mode, the ratio threshold is increased. In addition, when the memory management circuit 502 determines that the effective ratio is not less than the previous effective ratio, the ratio threshold is reduced. In other words, when the effective ratio is high, it means that the switch from the first mode to the second mode is effective, because the third buffer adequately carries the other multiple commands or multiple data between the read commands corresponding to the random read operation mode. Therefore, the memory management circuit 502 may reduce the ratio threshold when the effective ratio is high, and increase a probability of entering into the second mode.

Figure 11:
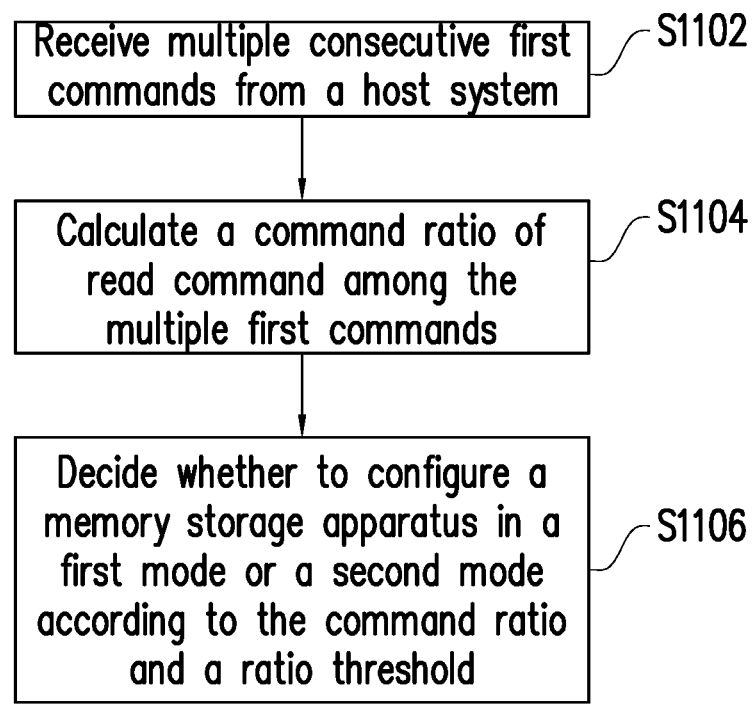
FIG. 11 is a flowchart of a method for managing the memory buffer according to an exemplary embodiment of the disclosure.

FIG. 11 is a flowchart of a method for managing the memory buffer according to an exemplary embodiment of the disclosure.

With reference to FIG. 11, in Step S1102, the multiple consecutive first commands from the host system are received. In Step S1104, the command ratio of the read commands among the multiple first commands is calculated. In Step S1106, whether to configure the memory storage apparatus in the first mode or the second mode is decided according to the command ratio and the ratio threshold.

However, as each step in FIG. 11 has been described in detail in the foregoing paragraphs, they are not repeated here. It should be noted that each step in FIG. 11 may be implemented as multiple program codes or circuits, but the disclosure is not limited thereto. In addition, the method in FIG. 11 may be used in conjunction with the above exemplary embodiments, or may be used alone, and the disclosure is not limited thereto.

In summary, the method for managing the buffer memory, the memory control circuit unit, and the memory storage apparatus provided by the disclosure may dynamically configure the buffers of the buffer memory according to the read operation mode executed by the host system. For example, in the exemplary embodiment of the disclosure, when the ratio of the read commands corresponding to the random read operation mode among the multiple commands exceeds the threshold, the accelerated mode is executed in the buffer memory, so as to configure more storage space to temporarily store the logical-to-physical address mapping table. On the other hand, the embodiments of the disclosure may dynamically adjust the threshold for determining whether to enter the accelerated mode. In this way, the embodiments of the disclosure can execute the accelerated mode at an appropriate time, thereby improving the speed and the performance of the memory storage apparatus during data reading.

Although the disclosure has been described with reference to the above-mentioned embodiments, it is not intended to be exhaustive or to limit the disclosure to the precise form or to exemplary embodiments disclosed. It is apparent to one of ordinary skill in the art that modifications to the described embodiments may be made without departing from the spirit and the scope of the disclosure. Accordingly, the scope of the disclosure is defined by the claims appended hereto and their equivalents in which all terms are meant in their broadest reasonable sense unless otherwise indicated.

What is claimed is:

1. A method for managing a memory buffer, applicable to a memory storage apparatus, wherein the memory storage apparatus comprises a rewriteable non-volatile memory module and a buffer memory, and the rewrite able non-volatile memory module stores a plurality of logical-to-physical address mapping tables, the method comprising:
    receiving a plurality of consecutive first commands from a host system;
    calculating a command ratio of read command corresponding to a random read operation mode among the plurality of first commands;
    deciding to configure the memory storage apparatus in a first mode or a second mode according to the command ratio and a ratio threshold;
    configuring a first buffer in the buffer memory to temporarily store the logical-to-physical address mapping table in response to the memory storage apparatus being configured in the first mode, wherein the first buffer has a first capacity; and
    configuring a second buffer in the buffer memory to temporarily store the logical-to-physical address mapping table in response to the memory storage apparatus being configured in the second mode, wherein the second buffer has a second capacity,
    wherein the second capacity is greater than the first capacity,
    adjusting the ratio threshold according to an effective ratio,
    wherein in response to the memory storage apparatus being configured in the second mode, the method further comprises:
    configuring a third buffer in the buffer memory to temporarily store data associated with a write command of the host system, wherein the third buffer is different from the second buffer and the third buffer has a third capacity,
    recording a total number of times of the memory storage apparatus switching from being configured in the second mode to being configured in the first mode and a number of times of the cache unit comprised in the third buffer being full during switching,
    obtaining the effective ratio according to the number of times and the total number of times.

2. The method for managing the memory buffer according to claim 1, wherein the logical-to-physical address mapping table temporarily stored in the first buffer and the second buffer is loaded from the rewriteable non-volatile memory module.

3. The method for managing the memory buffer according to claim 1, wherein the step of deciding to configure the memory storage apparatus in the first mode or the second mode according to the command ratio and the ratio threshold comprises:
    configuring the memory storage apparatus in the first mode in response to the command ratio being less than the ratio threshold; and
    configuring the memory storage apparatus in the second mode in response to the command ratio not being less than the ratio threshold.

4. The method for managing the memory buffer according to claim 1, wherein the step of deciding to configure the memory storage apparatus in the first mode or the second mode according to the command ratio and the ratio threshold comprises:
    determining whether a cache unit comprised in the third buffer is full; and
    configuring the memory storage apparatus in the first mode in response to the cache unit comprised in the third buffer being full.

5. The method for managing the memory buffer according to claim 1, wherein the data associated with the write command comprises the write command and write data corresponding to the write command.

6. The method for managing the memory buffer according to claim 1, further comprising:
    calculating a ratio of the number of times to the total number of times to obtain the effective ratio.

7. The method for managing the memory buffer according to claim 6, wherein the step of adjusting the ratio threshold according to the effective ratio comprises:
    increasing the ratio threshold when the effective ratio is less than a previous effective ratio calculated when the memory storage apparatus previously switches from being configured in the second mode to being configured in the first mode; and
    reducing the ratio threshold when the effective ratio is not less than the previous effective ratio.

8. The method for managing the memory buffer according to claim 1, further comprising:
    configuring a fourth buffer in the buffer memory in response to the memory storage apparatus being configured in the first mode, wherein the fourth buffer is different from the first buffer and the fourth buffer has a fourth capacity,
    wherein a sum of the first capacity and the fourth capacity is equal to a sum of the second capacity and the third capacity.

9. A memory control circuit unit, configured to control a memory storage apparatus, wherein the memory storage apparatus comprises a rewriteable non-volatile memory module, the rewriteable non-volatile memory module stores a plurality of logical-to-physical address mapping tables, the memory control circuit unit comprising:
    a host interface, configured to couple to a host system;

a memory interface, configured to couple to the rewriteable non-volatile memory module;
a buffer memory, coupled to the host interface and the memory interface; and
a memory management circuit, coupled to the host interface, the memory interface, and the buffer memory, wherein the memory management circuit is configured to:
receive a plurality of consecutive first commands from the host system,
calculate a command ratio of read command corresponding to a random read operation mode among the plurality of first commands and
decide whether to configure the memory storage apparatus in a first mode or a second mode according to the command ratio and a ratio threshold,
wherein the memory management circuit is further configured to configure a first buffer in the buffer memory to temporarily store the logical-to-physical address mapping table in response to the memory storage apparatus being configured in the first mode, wherein the first buffer has a first capacity, and
the memory management circuit is further configured to configure a second buffer in the buffer memory to temporarily store the logical-to-physical address mapping table in response to the memory storage apparatus being configured in the second mode, wherein the second buffer has a second capacity,
wherein the second capacity is greater than the first capacity,
the memory management circuit is further configured to adjust the ratio threshold according to an effective ratio,
wherein in response to the memory storage apparatus being configured in the second mode, the memory management circuit is further configured to configure a third buffer in the buffer memory to temporarily store data associated with a write command of the host system,
wherein the third buffer is different from the second buffer and the third buffer has a third capacity,
wherein the memory management circuit is further configured to record a total number of times of the memory storage apparatus switching from being configured in the second mode to being configured in the first mode and a number of times of the cache unit comprised in the third buffer being full during switching,
wherein the memory management circuit is further configured to obtain the effective ratio according to the number of times and the total number of times.

10. The memory control circuit unit according to claim 9, wherein the logical-to-physical address mapping table temporarily stored in the first buffer and the second buffer is loaded from the rewriteable non-volatile memory module.

11. The memory control circuit unit according to claim 9, wherein the operation of deciding to configure the memory storage apparatus in the first mode or the second mode according to the command ratio and the ratio threshold comprises:
configuring the memory storage apparatus in the first mode in response to the command ratio being less than the ratio threshold; and
configuring the memory storage apparatus in the second mode in response to the command ratio not being less than the ratio threshold.

12. The memory control circuit unit according to claim 9, wherein the operation of deciding to configure the memory storage apparatus in the first mode or the second mode according to the command ratio and the ratio threshold comprises:
determining whether a cache unit comprised in the third buffer is full; and
configuring the memory storage apparatus in the first mode in response to the cache unit comprised in the third buffer being full.

13. The memory control circuit unit according to claim 9, wherein the data associated with the write command comprises the write command and write data corresponding to the write command.

14. The memory control circuit unit according to claim 9, wherein the memory management circuit is further configured to:
calculate a ratio of the number of times to the total number of times to obtain the effective ratio.

15. The memory control circuit unit according to claim 14, wherein the operation of adjusting the ratio threshold according to the effective ratio comprises:
increasing the ratio threshold when the effective ratio is less than a previous effective ratio calculated when the memory storage apparatus previously switches from being configured in the second mode to being configured in the first mode; and
reducing the ratio threshold when the effective ratio is not less than the previous effective ratio.

16. The memory control circuit unit according to claim 9, wherein the memory management circuit is further configured to configure a fourth buffer in the buffer memory in response to the memory storage apparatus being configured in the first mode, wherein the fourth buffer is different from the first buffer and the fourth buffer has a fourth capacity,
wherein a sum of the first capacity and the fourth capacity is equal to a sum of the second capacity and the third capacity.

17. A memory storage apparatus, comprising:
a connection interface unit, configured to couple to a host system;
a rewriteable non-volatile memory module, storing a plurality of logical-to-physical address mapping tables; and
a memory control circuit unit, coupled to the connection interface unit and the rewriteable non-volatile memory module, and comprising a buffer memory, wherein the memory control circuit unit is configured to:
receive a plurality of consecutive first commands from the host system;
calculate a command ratio of read command corresponding to a random read operation mode among the plurality of first commands; and
decide whether to configure the memory storage apparatus in a first mode or a second mode according to the command ratio and a ratio threshold,
wherein the memory control circuit unit is further configured to configure a first buffer in the buffer memory to temporarily store the logical-to-physical address mapping table in response to the memory storage apparatus being configured in the first mode, wherein the first buffer has a first capacity, and
the memory control circuit unit is further configured to configure a second buffer in the buffer memory to temporarily store the logical-to-physical address mapping table in response to the memory storage apparatus being configured in the second mode, wherein the second buffer has a second capacity, wherein the second capacity is greater than the first capacity, the memory control circuit unit is further configured to adjust the ratio threshold according to an effective ratio, wherein in response to the memory storage apparatus being configured in the second mode, the memory control circuit unit is further configured to configure a third buffer in the buffer memory to temporarily store data associated with a write command of the host system, wherein the third buffer is different from the second buffer and the third buffer has a third capacity, wherein the memory control circuit unit is further configured to record a total number of times of the memory storage apparatus switching from being configured in the second mode to being configured in the first mode and a number of times of the cache unit comprised in the third buffer being full during switching and obtain the effective ratio according the number of times and the total number of times.

18. The memory storage apparatus according to claim 17, wherein the logical-to-physical address mapping table temporarily stored in the first buffer and the second buffer is loaded from the rewriteable non-volatile memory module.

19. The memory storage apparatus according to claim 17, wherein the operation of deciding to configure the memory storage apparatus in the first mode or the second mode according to the command ratio and the ratio threshold comprises:

configuring the memory storage apparatus in the first mode in response to the command ratio being less than the ratio threshold; and configuring the memory storage apparatus in the second mode in response to the command ratio not being less than the ratio threshold.

20. The memory storage apparatus according to claim 17, wherein the operation of deciding to configure the memory storage apparatus in the first mode or the second mode according to the command ratio and the ratio threshold comprises:

determining whether a cache unit comprised in the third buffer is full; and configuring the memory storage apparatus in the first mode in response to the cache unit comprised in the third buffer being full.

21. The memory storage apparatus according to claim 17, wherein the data associated with the write command comprises the write command and write data corresponding to the write command.

22. The memory storage apparatus according to claim 17, wherein the memory control circuit unit is further configured to:

calculate a ratio of the number of times to the total number of times to obtain the effective ratio.

23. The memory storage apparatus according to claim 22, wherein the operation of adjusting the ratio threshold according to the effective ratio comprises:

increasing the ratio threshold when the effective ratio is less than a previous effective ratio calculated when the memory storage apparatus previously switches from being configured in the second mode to being configured in the first mode; and reducing the ratio threshold when the effective ratio is not less than the previous effective ratio.

24. The memory storage apparatus according to claim 17, wherein the memory control circuit unit is further configured to configure a fourth buffer in the buffer memory in response to the memory storage apparatus being configured in the first mode, wherein the fourth buffer is different from the first buffer and the fourth buffer has a fourth capacity, wherein a sum of the first capacity and the fourth capacity is equal to a sum of the second capacity and the third capacity.

* * * * *